United States Patent
Suzuki

(10) Patent No.: US 7,646,188 B2
(45) Date of Patent: Jan. 12, 2010

(54) VOLTAGE REGULATOR FOR GENERATING CONSTANT OUTPUT VOLTAGE

(75) Inventor: Teruo Suzuki, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/070,162

(22) Filed: Feb. 15, 2008

(65) Prior Publication Data

US 2008/0224680 A1    Sep. 18, 2008

(30) Foreign Application Priority Data

Feb. 17, 2007  (JP) .............................. 2007-037232

(51) Int. Cl.
G05F 1/10      (2006.01)
G05F 1/656    (2006.01)

(52) U.S. Cl. ...................... 323/284; 323/282; 323/286; 323/222

(58) Field of Classification Search ................. 323/282, 323/284, 285, 286, 222
See application file for complete search history.

(56) References Cited

U.S. PATENT DOCUMENTS

| 6,222,355 | B1 * | 4/2001 | Ohshima et al. ............ 323/282 |
| 6,269,011 | B1 * | 7/2001 | Ohshima ..................... 363/50 |
| 6,870,351 | B2 * | 3/2005 | Sugimura ................... 323/277 |
| 6,914,421 | B2 * | 7/2005 | Yamamoto .................. 323/289 |
| 7,176,666 | B2 * | 2/2007 | Yamamoto .................. 323/282 |
| 2008/0024099 | A1 * | 1/2008 | Oki et al. .................... 323/282 |

FOREIGN PATENT DOCUMENTS

JP    2005352715    12/2005

* cited by examiner

Primary Examiner—Bao Q Vu
(74) Attorney, Agent, or Firm—Adams & Wilks

(57) ABSTRACT

A voltage regulator has an output transistor that receives an input voltage inputted via an input terminal and that outputs a constant output voltage via an output terminal. A voltage divider circuit divides the output voltage to generate a divided voltage. A reference voltage circuit generates a reference voltage. An error amplifier circuit generates an error signal by comparing the divided voltage with the reference voltage. A protection circuit detects an abnormal state of the voltage regulator. A control circuit controls the output transistor to increase the output voltage to maintain the output voltage constant when an error signal is generated by the error amplifier circuit, and does not control the output transistor to increase the output voltage when the protection circuit detects an abnormal state of the voltage regulator.

14 Claims, 2 Drawing Sheets

US 7,646,188 B2

VOLTAGE REGULATOR FOR GENERATING CONSTANT OUTPUT VOLTAGE

BACKGROUND OF THE INVENTION

1. Field of the Invention

The present invention relates to a voltage regulator that generates a constant output voltage from an input voltage.

2. Description of the Related Art

In general, an electronic device such as a mobile phone operates on a rechargeable battery. A voltage regulator is provided to the battery so that the electronic device stably operates without fluctuations of an output voltage to be supplied to the electronic device, even when a charge state of the battery fluctuates. The voltage regulator operates so as to stably operate the electronic device without the fluctuations of the output voltage supplied to the electronic device, even when a load applied by the electronic device rapidly fluctuates. Some voltage regulators include a control circuit for further stabilizing the output voltage of the voltage regulator.

Hereinafter, a description is given of a voltage regulator including the control circuit mounted thereto, which is proposed in JP 2005-352715 A. FIG. 3 is a circuit diagram of the voltage regulator of the related art.

An output voltage VOUT is divided by a resistor R13 and a resistor R14, with the result that a divided voltage VFB is obtained. An error amplifier circuit 31 compares the divided voltage VFB with a reference voltage VREF1, and operates so that the divided voltage VFB matches the reference voltage VREF1. Based on comparison results of the error amplifier circuit 31, a PMOS 32 is controlled, to thereby keep the output voltage VOUT constant.

In a case where the output voltage VOUT does not fluctuate transiently, a signal adding circuit 33 outputs a reference voltage VREF2 to an NMOS 31. A voltage between a gate and a source of the NMOS 31 does not exceed a threshold voltage of the NMOS 31, so the NMOS 31 does not operate. Accordingly, the control circuit 35 does not control the PMOS 32.

In a case where the output voltage VOUT drops transiently, a voltage at a predetermined internal node of the error amplifier circuit 31 rises transiently. The voltage at the internal node, which fluctuates transiently, is detected by a detection circuit 32. The signal adding circuit 33 adds the voltage, which is detected by the detection circuit 32, to the reference voltage VREF2, and outputs an addition result to the NMOS 31. The voltage between a gate and a source of the NMOS 31 exceeds the threshold voltage of the NMOS 31, so the NMOS 31 operates. Accordingly, the control circuit 35 controls the PMOS 32. Specifically, the NMOS 31 causes a current to flow, whereby a gate voltage of the PMOS 32 drops and the PMOS 32 is turned on. Then, the output voltage VOUT rises and the output voltage VOUT is kept constant.

Further, a description is given of a voltage regulator having a control circuit mounted thereto, which is proposed in Hoi Lee, K. T. Mok, Ka Nang Leung, "Design of Low-Power Analog Drivers Based on Slew-Rate Enhancement Circuits for CMOS Low-Dropout Regulators," IEEE TRANSACTIONS ON CIRCUIT AND SYSTEMS. FIG. 4 is a circuit diagram of the voltage regulator of the related art.

In a case where an output voltage VOUT drops transiently, a voltage at a predetermined internal node of an error amplifier circuit 25 rises transiently. The voltage at the internal node, which fluctuates transiently, is detected by a control circuit 26. The control circuit 26 outputs a detection result to a PMOS 35. Then, a gate voltage of the PMOS 35 drops and the PMOS 35 is turned on. After that, the output voltage VOUT rises and the output voltage is kept constant.

Incidentally, the output voltage drops transiently not only due to the rapid fluctuations of the load connected to an output terminal, but also due to a protection function for stopping an output of the voltage regulator according to an overcurrent state and an overheat state of the voltage regulator.

When the load rapidly fluctuates, the control circuit 35 may perform an operation of detecting a reduction in the output voltage VOUT to increase the output voltage VOUT. However, if the control circuit 35 performs the above-mentioned operation when the protection function is activated, the output voltage VOUT rises despite the fact that the output of the voltage regulator is stopped so as to protect the voltage regulator. As a result, the protection function of the voltage regulator does not work. Accordingly, the safety of the voltage regulator is reduced.

SUMMARY OF THE INVENTION

The present invention has been made in view of the above-mentioned problems, and therefore an object of the present invention is to provide a voltage regulator with high safety.

In order to solve the above-mentioned problems, the present invention provides a voltage regulator with the following configuration.

That is, there is provided a voltage regulator including: an output transistor for outputting a constant output voltage from an input voltage; a voltage divider circuit for dividing the output voltage to output a generated divided voltage; a reference voltage circuit for generating a reference voltage; an error amplifier circuit for receiving the reference voltage and the divided voltage as inputs to control the output transistor to keep the output voltage constant; a protection circuit for detecting an abnormality of the voltage regulator to control an output of the output transistor; and a control circuit provided between the error amplifier circuit and the output transistor, for controlling the output transistor so as to increase the output voltage when a signal for increasing the output voltage is received from the error amplifier circuit, and for stopping control of the output transistor when a signal indicating that the abnormality is detected is received from the protection circuit.

In the present invention, in a case where the output voltage drops transiently due to an operation of the protection circuit, instead of performing an operation for increasing the output voltage, the control circuit stops the output of the voltage regulator to protect the voltage regulator, whereby a protection function of the voltage regulator is activated. As a result, the safety of the voltage regulator is increased.

DETAILED DESCRIPTION OF THE PREFERRED EMBODIMENT

Hereinafter, an embodiment of the present invention will be described with reference to the attached drawings.

Figure 1:
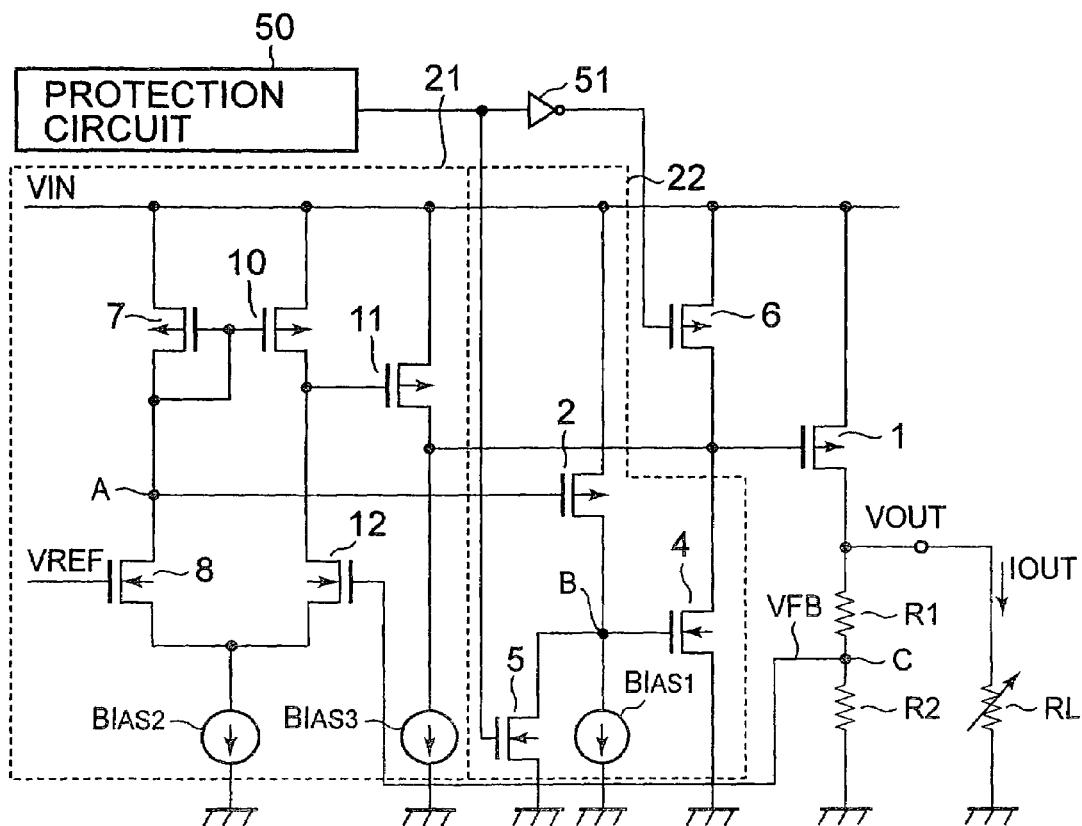
FIG. 1 is a circuit diagram showing a voltage regulator according to the present invention.

First, a configuration of a voltage regulator according to the embodiment of the present invention will be described. FIG. 1 is a circuit diagram of the voltage regulator.

In the voltage regulator that generates a constant output voltage from an input voltage, an input voltage VIN is inputted and an output voltage VOUT is outputted. The output voltage VOUT is divided into a divided voltage VFB. The divided voltage VFB is compared with a reference voltage VREF.

The voltage regulator includes a protection circuit 50, an error amplifier circuit 21, and a control circuit 22. The voltage regulator further includes an inverter 51, a p-channel field effect transistor (PMOS) 6 (fifth transistor), a PMOS 1 (first transistor), a resistor R1, and a resistor R2 (voltage divider circuits).

The error amplifier circuit 21 includes a PMOS 7 (sixth transistor), a PMOS 10 (eighth transistor), a PMOS 11 (ninth transistor), a constant current circuit BIAS2, and a constant current circuit BIAS 3. The control circuit 22 includes a PMOS 2 (second transistor), an NMOS 4 (third transistor), an NMOS 5 (fourth transistor), and a constant current circuit BIAS1.

The PMOS 7 has a gate connected to a gate of the PMOS 10, a source connected to an input terminal, and a drain connected to each of the source and a contact A. The PMOS 10 has a source connected to the input terminal, and a drain connected to a drain of the NMOS 12. The PMOS 11 has a gate connected to the drain of the PMOS 10, a source connected to the input terminal, and a drain connected to each of the constant current circuit BIAS3 and a gate of the PMOS 1. The NMOS 8 has a gate connected to a reference voltage circuit (not shown), a source connected to the constant current circuit BIAS2, and a drain connected to the contact A. The NMOS 12 has a gate connected to a contact C, a source connected to the constant current circuit BIAS2, and a drain connected to the drain of the PMOS 10. The protection circuit 50 is connected to a gate of the NMOS 5, and is also connected to the PMOS 6 through the inverter 51. The PMOS 2 has a gate connected to the contact A, a source connected to the input terminal, and a drain connected to the constant current circuit BIAS1 through a contact B. The PMOS 6 has a source connected to the input terminal, and a drain connected to the gate of the PMOS 1. The NMOS 5 has a source connected to a ground, and a drain connected to the contact B. The NMOS 4 has a gate connected to the contact B, a source connected to the ground, and a drain connected to the gate of the PMOS 1. The PMOS 1 has a source connected to the input terminal, and a drain connected to an output terminal. The resistor R1 is provided between the output terminal and the contact C. The resistor R2 is provided between the ground and the contact C. A load RL is provided between the output terminal and the ground.

The constant current circuits BIAS1, BIAS2, and BIAS3 each cause a predetermined current to flow based on the reference voltage VREF generated by the reference voltage circuit. The resistors R1 and R2 are voltage divider circuits, and the voltage divider circuits each divide the output voltage VOUT and output the generated divided voltage VFB. The error amplifier circuit 21 operates so that the reference voltage VREF matches the divided voltage VFB, thereby keeping the output voltage VOUT constant. Also, the control circuit 22 keeps the output voltage VOUT constant. The protection circuit 50 protects the voltage regulator. Specifically, the protection circuit 50 includes an overcurrent protection circuit (not shown) and an overheat protection circuit (not shown). In a case where an overcurrent state of an output current IOUT of the voltage regulator is detected, the overcurrent protection circuit stops an output of the voltage regulator to protect the voltage regulator so that an excessive output current IOUT is prevented from flowing. In a case where an overheat state due to heat generation of the voltage regulator is detected, the overheat protection circuit stops the output of the voltage regulator to protect the voltage regulator so that heat generation in excess of an allowable loss is prevented from occurring to thereby prevent an IC from being damaged.

Figure 2:
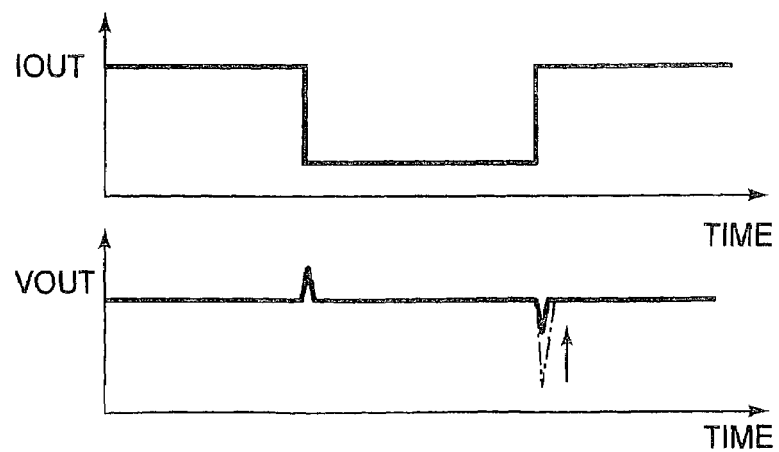
FIG. 2 is a timing chart showing an output current and an output voltage.
Figure 3:
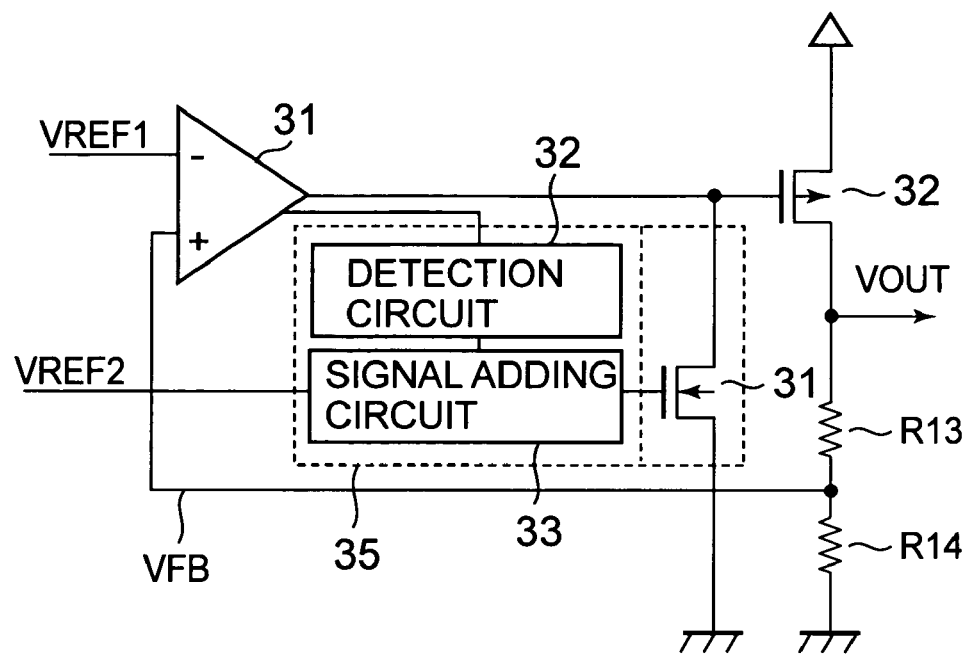
FIG. 3 is a circuit diagram showing a voltage regulator of a related art.
Figure 4:
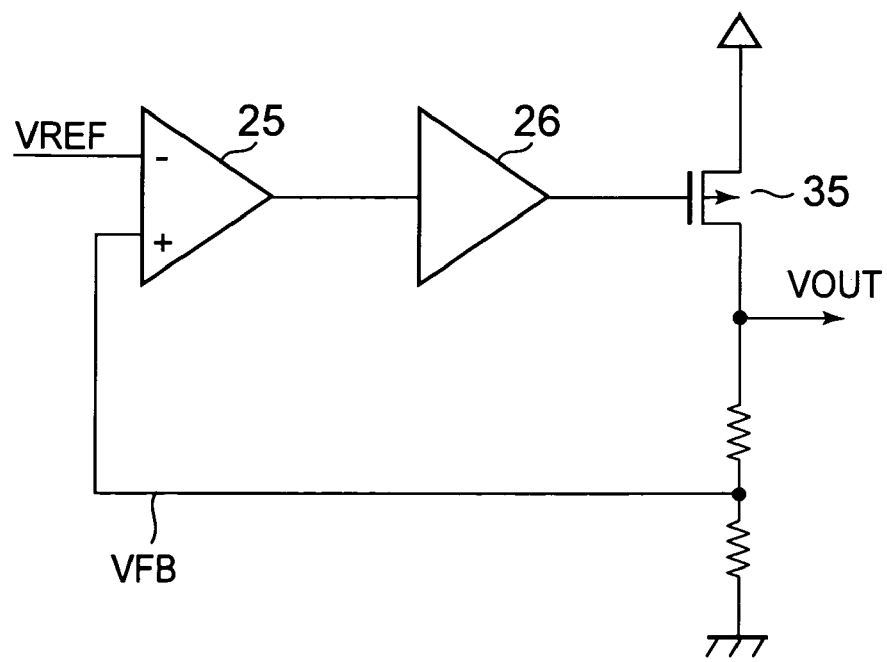
FIG. 4 is a circuit diagram showing a voltage regulator of another related art.

Next, operations of the voltage regulator will be described. FIG. 2 is a timing chart showing the output current and the output voltage.

(Operation 1) (See FIG. 2)

In a case where the overcurrent state and the overheat state are not detected and the output voltage VOUT drops transiently due to rapid fluctuations of the load RL, the divided voltage VFB also drops and the divided voltage VFB becomes lower than the reference voltage VREF. Then, the NMOS 8 is more likely to be turned on than the NMOS 12, and an on-resistance of the NMOS 8 becomes smaller than that of the NMOS 12, whereby a voltage at the contact A drops. The voltage at the contact A is applied to the gate of the PMOS 2, and a current flowing through the PMOS 2 increases. When the current caused to flow by the PMOS 2 is larger than a current preset in the constant current circuit BIAS1, a voltage at the contact B rises. When the voltage at the contact B is applied to the gate of the NMOS 4, the current flowing through the NMOS 4 increases and the on-resistance of the NMOS 4 decreases. Then, the gate voltage of the PMOS 1 drops, and the output current IOUT of the voltage regulator increases. Further, as indicated by the arrow of FIG. 2, the output voltage VOUT outputted by the PMOS 1 serving as an output transistor rises so as to be kept constant. In other words, the control circuit 22 operates so as to increase the output voltage VOUT. In this case, the dotted line of FIG. 2 represents a waveform of the output voltage VOUT obtained when the voltage regulator does not include the control circuit 22. The solid line of FIG. 2 represents a waveform of the output voltage VOUT obtained when the voltage regulator includes the control circuit 22. Note that a set current value of the current preset in the constant current circuit BIAS1 is larger than a current value of the current flowing through the PMOS 2 when the voltage regulator is normally operating. Further, when the set current value is set to be larger, the PMOS 4 is hardly turned on, and when the set current value is set to be smaller, the PMOS 4 is more likely to be turned on.

(Operation 2) (Not Shown)

In a case where the overcurrent state and the overheat state are detected, when the output of the voltage regulator is stopped and the output voltage VOUT drops transiently due to the operation of the protection circuit for protecting the voltage regulator, the protection circuit 50 outputs a high signal. Then, the gate voltage of the PMOS 6 becomes low and the PMOS 6 is turned on, whereby the gate voltage of the PMOS 1 rises. As a result, the PMOS 1 is turned off, and the output voltage VOUT outputted by the PMOS 1 serving as the output transistor drops.

In this case, the current flowing through the PMOS 2 increases as described above, but the high signal is outputted by the protection circuit 50 and the NMOS 5 is turned on. Accordingly, the current caused to flow by the PMOS 2 is caused to flow to the ground by the NMOS 5. In other words, because the NMOS 5 is turned on, the voltage at the contact B does not rise but drops. As a result, the NMOS 4 cannot be turned on, and the on-resistance of the NMOS 4 is kept high instead of decreasing. Further, the gate voltage of the PMOS 1 is also kept high instead of decreasing, the output current IOUT of the voltage regulator decreases, and the output voltage VOUT can drop. In other words, the control circuit 22 does not perform an operation for increasing the output voltage VOUT.

In such a configuration, when the output voltage VOUT drops transiently due to the rapid fluctuations of the load RL, the control circuit 22 operates so as to increase the output voltage VOUT, whereby the output voltage VOUT rises and the fluctuations of the output voltage VOUT are suppressed. Accordingly, the output voltage VOUT is kept constant.

Further, when the output voltage VOUT drops transiently due to the operation of the protection circuit, the control circuit 22 does not perform the operation for increasing the output voltage VOUT. Accordingly, the output of the voltage regulator is stopped so as to protect the voltage regulator, and a protection function of the voltage regulator is activated. As a result, the safety of the voltage regulator is increased.

What is claimed is:

1. A voltage regulator, comprising:
an output transistor for outputting a constant output voltage from an input voltage;
a voltage divider circuit for dividing the output voltage to output a generated divided voltage;
a reference voltage circuit for generating a reference voltage;
an error amplifier circuit for receiving the reference voltage and the divided voltage as inputs to control the output transistor to keep the output voltage constant;
a protection circuit for detecting an abnormal state of the voltage regulator to control an output current of the output transistor to decrease; and
a control circuit for controlling the output transistor so as to increase the output voltage when a signal for increasing the output voltage is received from the error amplifier circuit, and for stopping control of the output transistor when a signal indicating that an abnormal state is detected is received from the protection circuit.

2. A voltage regulator according to claim 1; wherein the abnormal state detected by the protection circuit is an overcurrent state of the voltage regulator.

3. A voltage regulator according to claim 1; wherein the abnormal state detected by the protection circuit is an overheat state of the voltage regulator.

4. A voltage regulator comprising:
an output transistor that receives an input voltage inputted via an input terminal and that outputs a constant output voltage via an output terminal;
a voltage divider circuit that divides the output voltage to produce a divided voltage;
a reference voltage circuit that generates a reference voltage;
an error amplifier circuit that produces an error signal by comparing the divided voltage with the reference voltage;
a protection circuit that detects an abnormal state of the voltage regulator; and
a control circuit that controls the output transistor to increase the output voltage to maintain the output voltage constant when an error signal is produced by the error amplifier circuit, and that does not control the output transistor to increase the output voltage when the protection circuit detects an abnormal state of the voltage regulator.

5. A voltage regulator according to claim 4; wherein the error signal produced by the error amplifier circuit corresponds to a transient drop in the output voltage due to rapid fluctuations of a load connected to the output terminal.

6. A voltage regulator according to claim 4; wherein the output transistor comprises a first transistor; the control circuit comprises second, third and fourth transistors and a first constant current circuit; the voltage regulator comprises a fifth transistor; the error amplifier circuit comprises sixth, seventh, eighth, ninth and tenth transistors and second and third constant current circuits; and further comprising a first contact disposed between the sixth and seventh transistors, a second contact disposed between the second transistor and the first constant current circuit, and a third contact connected to the voltage divider circuit.

7. A voltage regulator according to claim 6; wherein the sixth transistor has a gate connected to a gate of the ninth transistor, a source connected to the input terminal, and a drain connected to the source and the first contact; wherein the eighth transistor has a source connected to the input terminal and a drain connected to a drain of the tenth transistor; wherein the ninth transistor has a gate connected to the drain of the eighth transistor, a source connected to the input terminal, and a drain connected to the third constant current circuit and a gate of the first transistor; wherein the seventh transistor has a gate connected to the reference voltage circuit, a source connected to the second constant current circuit, and a drain connected to the first contact; and wherein the tenth transistor has a gate connected to the third contact, a source connected to the second constant current circuit, and a drain connected to the drain of the eighth transistor.

8. A voltage regulator according to claim 7; wherein the second transistor has a gate connected to the first contact, a source connected to the input terminal, and a drain connected to the first constant current circuit through the second contact; wherein the fifth transistor has a gate connected to the protection circuit through an inverter, a source connected to the input terminal, and a drain connected to the gate of the first transistor; wherein the fourth transistor has a gate connected to the protection circuit, a source connected to a ground, and a drain connected to the second contact; wherein the third transistor has a gate connected to the second contact, a source connected to the ground, and a drain connected to the gate of the first transistor; and wherein the first transistor has a source connected to the input terminal and a drain connected to the output terminal.

9. A voltage regulator according to claim 8; wherein the voltage divider circuit comprises a first resistor disposed between the output terminal and the third contact, and a second resistor disposed between the ground and the third contact.

10. A voltage regulator according to claim 8; wherein the error signal generated by the error amplifier circuit corresponds to a transient drop in the output voltage due to rapid fluctuations of a load connected between the output terminal and the ground.

11. A voltage regulator according to claim 10; wherein in a case in which an abnormal state of the voltage regulator is not detected by the protection circuit and the output voltage drops transiently due to rapid fluctuations of the load, the divided voltage drops to a level lower than the reference voltage, and a voltage at the first contact drops and is applied to the gate of the second transistor to increase a current flowing through the second transistor.

12. A voltage regulator according to claim 11; wherein when the current flowing through the second transistor is greater than a preset current in the first constant current circuit, a voltage at the second contact drops and, upon application of the voltage at the second contact to the gate of the third transistor, a current flowing through the third transistor increases and an on-resistance of the third transistor decreases, causing a gate voltage of the first transistor to drop, an output current of the voltage regulator to increase, and the output voltage outputted by the output transistor to rise so as to be kept constant.

13. A voltage regulator according to claim 4; wherein the abnormal state detected by the protection circuit is an overcurrent state of the voltage regulator.

14. A voltage regulator according to claim 4; wherein the abnormal state detected by the protection circuit is an overheat state of the voltage regulator.

* * * * *